United States Patent Office 3,090,863
Patented May 21, 1963

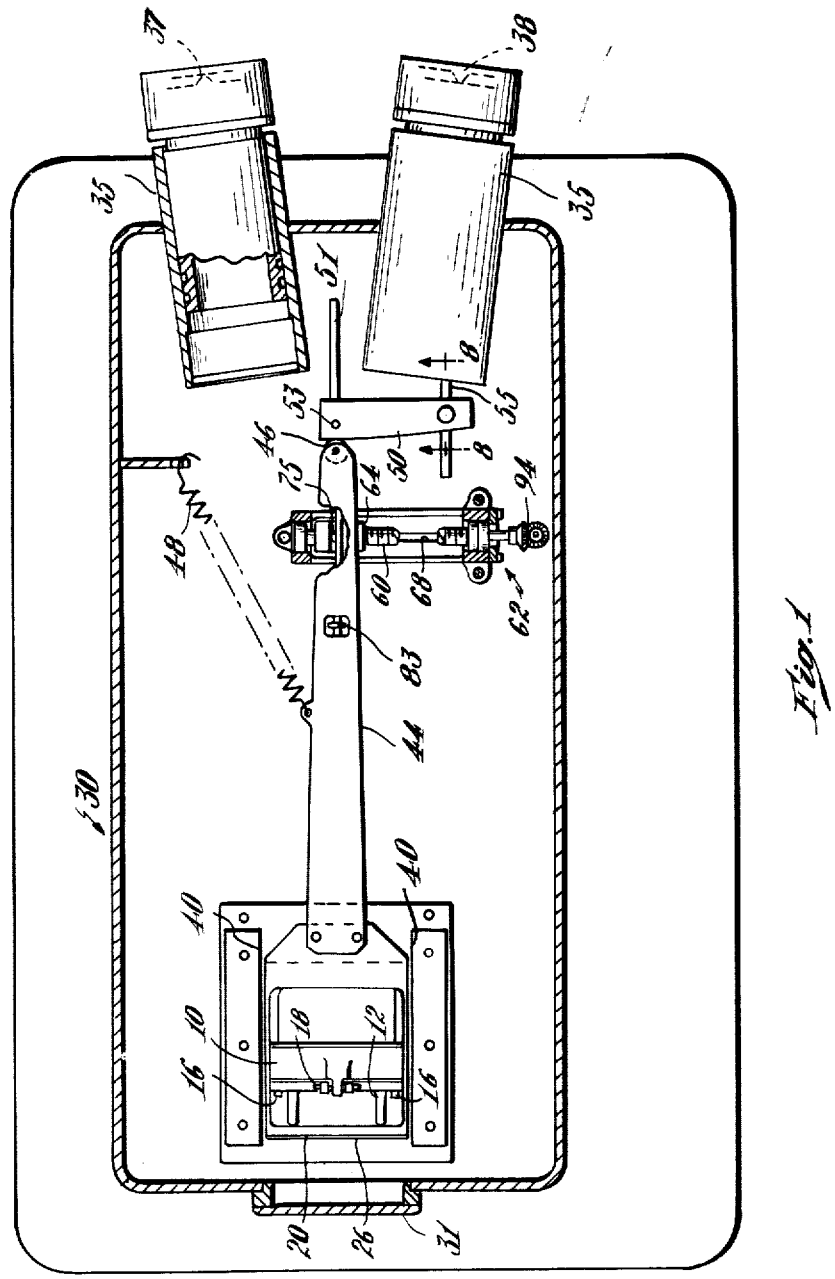

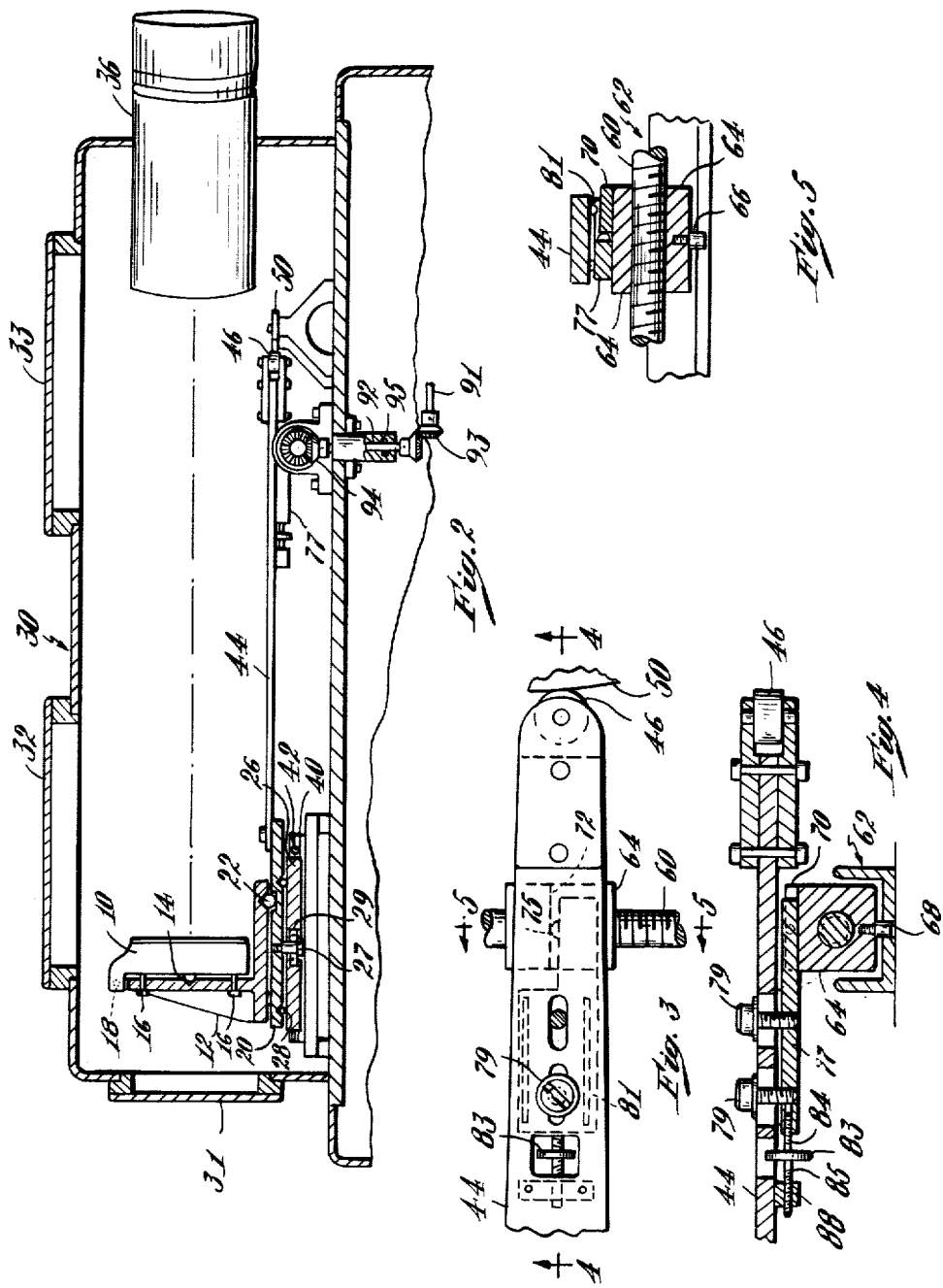

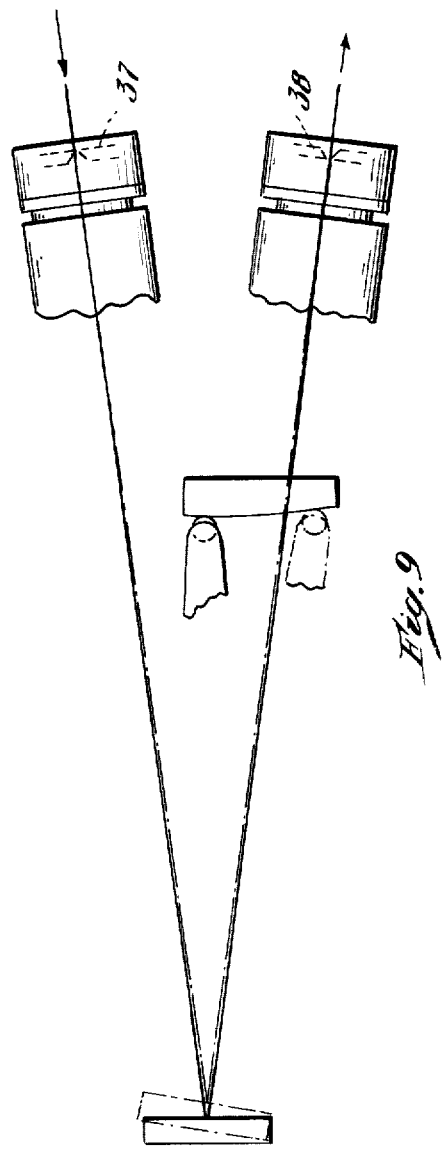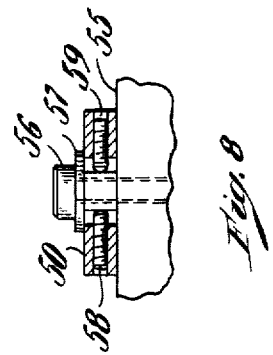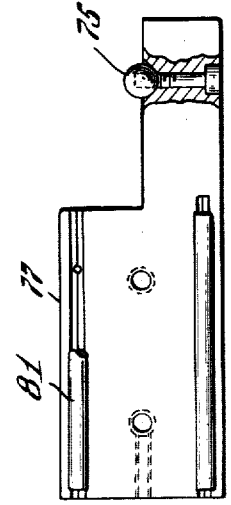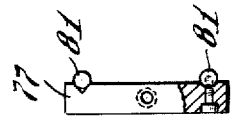

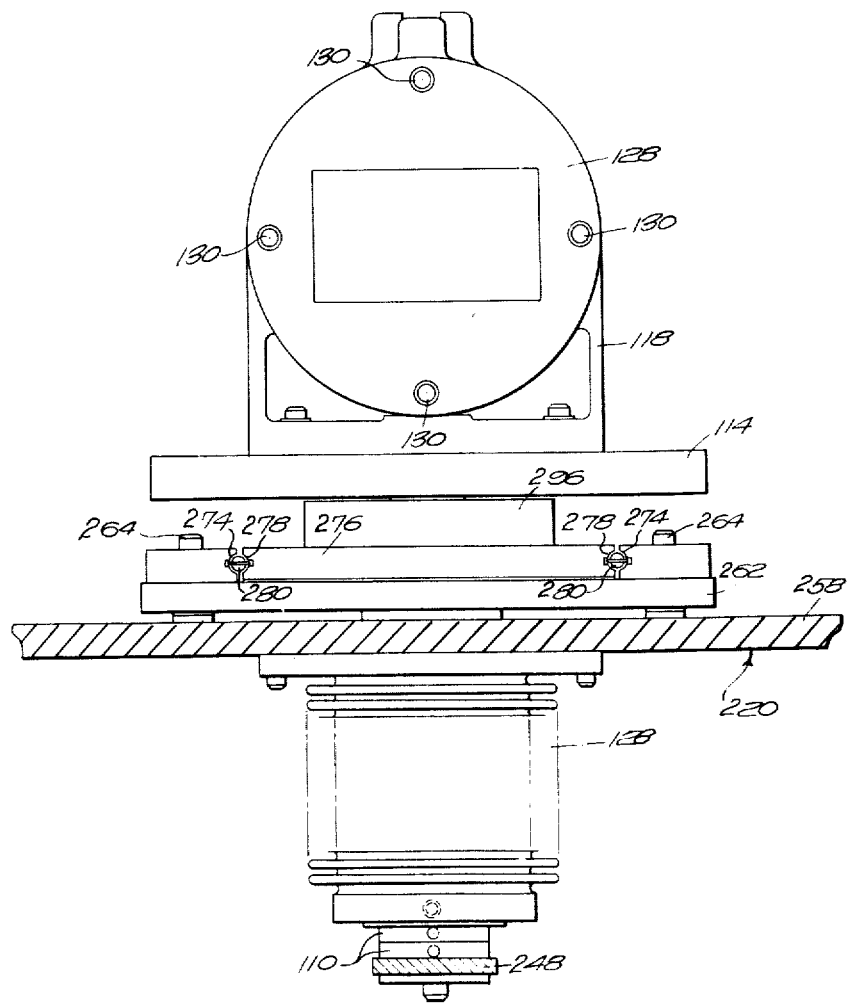
F I G. 14

3,090,863
MONOCHROMATOR ADAPTED FOR USE IN THE ULTRA-VIOLET REGION
Paul M. McPherson, Acton, Mass., assignor to McPherson Instrument Corporation, Acton, Mass., a corporation of Massachusetts
Filed Jan. 31, 1962, Ser. No. 170,004
23 Claims. (Cl. 250—43.5)

This invention relates to spectrometric apparatus and to monochromator particularly suitable for use in the vacuum ultraviolet wavelength region. This application is a continuation-in-part of my co-pending application Serial No. 82,615, filed January 13, 1961, now abandoned, and entitled Spectroscopic Apparatus.

In devising instruments for the investigation of vacuum ultraviolet spectra, it is typically necessary both to avoid the use of glass or other refractive material and to evacuate the light paths because of the high absorption of both solids and gases at short wavelengths. Image forming is therefore accomplished using reflective surfaces such as mirrors and gratings, the simplest monochromator optical system being one in which a single concave grating receives light directly from an entrance slit and projects a focused spectrum directly onto an exit slit.

An optical system using a single concave grating may be kept in focus relatively simply by constraining the three elements, the two slits and the grating, to move only along the Rowland circle. The Rowland circle is defined as that circle whose diameter is equal to the radius of curvature of the concave grating and whose center lies midway on a line extending between the center of the grating and the center of curvature of the grating. Such constraint may be provided by attaching each of the three elements to a link of length equal to the radius of the Rowland circle and joining the opposite ends of each link to a common pivot which then constitutes the center of the Rowland circle.

While such an arrangement maintains focus in a relatively simple manner, there are certain disadvantages. To scan a spectrum it is necessary to either physically move one of the slits or to move the grating which will swing both the entrance and exit beams through an appreciable angle about their respective slits. Either of these requirements is likely to produce difficulties in the positioning or manipulation of the light sources or detectors which will be associated with the slits.

Another approach to the problem of maintaining focus has resulted in the so-called Seya-Namioka type monochromator. In that device the entrance and exit beams form a critical angle of 70° 15' at the grating and scanning is accomplished by rotating the grating about its own vertical axis. The elements are not maintained on the Rowland circle but there is a canceling of focusing errors such that a highly satisfactory focus is maintained over an appreciable wavelength range without adjustment of split positions. However, because of the appreciable angle of incidence to the grating, there is a substantial amount of vertical astigmatism which, though it does not affect the lateral focus and resolution, causes a substantial loss of light energy. The large angle of incidence further develops an appreciable polarization in the exit beam which in many applications is unacceptable.

Accordingly, objects of the present invention are to provide a precisely focusing monochromator using a concave grating which operates at substantially normal incidence, in which both the entrance and exit slits are operationally stationary, that is fixed in location, and in which there is virtually no swinging of the light beams about their respective slits. Further objects are to provide such a monochromator in which wavelengths may be read off directly, as by linear correspondence with the rotation of a shaft, which is capable of high resolution, which is simple and reliable in operation, and which is of relatively simple and rugged construction.

The present invention contemplates a monochromator having stationary slit apertures in which normal incidence is approached closely, that is the two slits are spaced apart in the plane of dispersion only by an amount sufficient to insure adequate working space around each. Each of the slits is aimed at the nominal position of the grating and the two optical axes or beam paths form an acute angle at the grating. Scanning of a spectrum is obtained by rotating the grating about its own vertical axis, and focus is maintained by simultaneously translating that axis in a direction bisecting the angle between the optical axes. The translation of the grating necessary to obtain perfect focus at every wavelength is provided by a cam and cam follower mechanism one part of which is fixed and the other part of which is operationally rigid with the grating.

Preferably the grating is rotated by a sine drive mechanism which produces sine function rotation of the grating independently of its translation. In one aspect of the invention the sine drive mechanism involves a lever arm which is rigidly connected with the grating, a screw rotatably supported adjacent the lever arm and oriented transversely of the direction of translation movement of the grating, a nut for the screw, the nut including a flat surface which is parallel to the translational freedom of movement of the grating, a spherical surface element attached to the lever arm, and means for urging the spherical surface element into engagement with said flat surface, the spherical surface being located relative to the grating so that its center and the axis of rotation of the grating define a plane which is parallel to the translational freedom of movement of the grating when the central image of the entrance aperture falls on the exit aperture.

In the preferred embodiment the lever arm extends toward the slits, the cam controlling the focus is fixed, and the cam follower is attached to the end of the lever arm. The lever arm thus fulfills a dual function in achieving sine function rotation and in maintaining focus thereby facilitating an exceptionally simple, reliable and precisely functioning construction.

For the purpose of illustration, two embodiments of the invention are shown in the accompanying drawing in which FIG. 1 is a plan view of a vacuum ultraviolet monochromator;

FIG. 2 is a side elevation partially in section of the monochromator;

FIG. 3 is a plan view to an enlarged scale of a portion of a sine drive mechanism;

FIG. 4 is a section on the line of 4—4 of FIG. 3;

FIG. 5 is a section on the line 5—5 of FIG. 3;

FIG. 6 is an end view of a sine drive adjustment slide;

FIG. 7 is a plan view of the adjustment slide;

FIG. 8 is a section on the line 8—8 of FIG. 1;

FIG. 9 is a diagrammatic illustration of the behavior of the optical axes in the apparatus shown in FIGS. 1–8;

FIG. 14 is a front elevation of the grating mounting taken substantially on the line 14—14 of FIG. 11.

Figure 10:
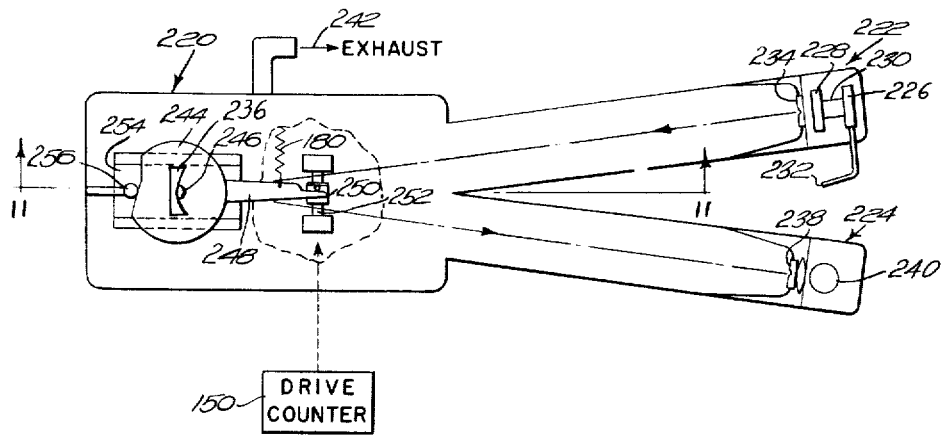
FIG. 10 is a top plan schematic view, partially broken away, of an alternative embodiment of an ultraviolet monochromator.

Referring now to the drawing and particularly to the apparatus illustrated in FIGS. 1 to 9, the device shown is adapted for use in the so-called vacuum ultraviolet wavelength region and is provided with an elongate, sealable vacuum chamber or housing 30. Appropriate access ports 31, 32 and 33 are included for original setting-up and adjustment. The relatively fragile grating used for dispersing the incoming radiation according to its component wavelengths is contained within a suitable holder 10 so that no mechanical stress is applied directly to the grating itself. The holder itself is supported within and at one end of the housing 30 by means explained in greater detail hereinafter and conventional entrance and exit slit tube assemblies, 35 and 36 respectively, project through the opposite end wall of the housing. The slits proper are indicated diagrammatically at 37 and 38 and are aimed at the nominal position of the grating. The slit tube assemblies 35 and 36 are placed as close together as is consonant with the need for working space around each of the slits so that the optical axes or light paths form an acute angle at the grating.

With reference to FIG. 2, the holder 10 is adjustably mounted on a grating bracket 12 by means of a sphere 14 which rests in a conical depression in each the holder 10 and the bracket 12 and by adjustment screws 16 and 18 which provide for canting and rotation of the grating, respectively, in conventional manner. The bracket 12 is in turn set, by means of a kinemetric mount, on a table 20. The kinemetric mount is of the type involving three spheres 22 which are attached to the bracket 12 and which bear against, respectively, a cone, an elongate V-groove and a flat formed in the upper surface of the table 20. By this means a grating may be removed and then replaced without readjustment or several preadjusted gratings may be interchanged quickly and easily.

The table 20 itself is rotatably supported on a slide 26 by a circular set of ball bearings 28 which provide a broad base for preventing tipping and by a shoulder screw 27 and bearing 29 which fix the pivot axis. The shoulder screw 27 also serves to preload the ball bearings 28. The slide 26 in turn is free to run on straight ways 40 which are fixed relative to the housing, the actual bearing force being carried by ball bearings 42. The ways are oriented so that the translational freedom of movement of the pivot axis is in a direction bisecting the angle formed by the optical axes. By this mounting system the grating, though otherwise tightly constrained, is free both to rotate about its own precisely defined vertical axis and to translate towards and from the slits.

Rigidly mounted on the table 20 is a lever arm 44 which extends generally towards the entrance and exit slit tube assemblies. The lever arm carries at its outer end a cam follower 46 which is urged, by the spring 48, against a cam 50 which is mounted in fixed relation to the housing 30 on supports 51 and 55. The engagement of the cam follower 46 with the cam 50 causes any rotation of the grating to be accompanied by a corresponding translation and the shape of the cam is such that the spectrum produced by the grating is always in focus on the exit aperture during scanning. FIG. 9 illustrates the nature of the compound movement executed by the grating and the effect produced thereby on the optical axes in their relation to the stationary slits. The central image positions of the grating and the optical axes are shown in solid lines and positions corresponding to a long wavelength setting of the instrument are indicated by broken lines. As may be seen, since the translation of the grating is in a direction bisecting the acute angle between the optical axes, the light paths themselves are displaced by only a negligible amount and there is an insignificant swinging of the beams about their respective slits. Further, since this swinging is much smaller than the width of the beams, it is possible to completely eliminate shifting of the beams by masking the entrance and exit beams with stationary masks. This masking causes only a very small reduction in the useful grating width. The arrangement of light sources and detectors for use with the fixed slits is thus quite simple.

Initial focusing of the apparatus is obtained as follows. The support 51 is located beneath that portion of the cam 50 against which the cam follower 46 bears when the grating is in its central image position and the cam 50 is pivotally mounted thereto by a pin 53. With the apparatus set for central image at the exit slit focus is obtained by adjustment of the positions of the slits in conventional manner. The apparatus is then shifted to a long wavelength position, for example so that the Mercury 5461 A. line falls on the exit slit, and focusing for this wavelength is accomplished by swinging the cam about the pivot pin 53. It should be noted that this latter focusing operation does not appreciably affect the focus previously obtained for central image and further that, if the cam 50 is properly shaped, the device will be precisely in focus for all wavelengths. The theoretically proper shape for the cam can be obtained by calculation but for practical reasons it is contemplated that a master cam be locally corrected on an empirical or experimental basis and that other cams be derived from that master. The provision for swinging the cam 50 about the pin 53 is shown in FIG. 8. The cam 50 is held to the second support 55 by a cap screw 56 and a flanged sleeve 57. Set screws 58 and 59, threaded into the cam 50 and bearing against the sleeve 57, provide the necessary range of adjustment.

The grating may be rotated so as to scan a spectrum at the exit slit by a sine drive mechanism which includes the lever arm 44. The drive involves a precision screw 60 which is mounted transversely of the ways 40 in a bearing assembly 62 which prevents any axial movement of the screw. As seen in FIG. 2, the drive for the screw 60 can be brought in from outside of the vacuum chamber 30 by means of suitable shafts 91 and 92 and bevel gears 93 and 94, the shaft 92 being vacuum sealed by an O-ring as at 95. The screw drives a nut 64 which is prevented from rotating by the engagement of a tail piece 66 with a slot 68 cut in the base of the bearing assembly 62. The nut carries on its upper surface an optical flat element 70 which is oriented with its optically flat surface 72 lying in a plane which is parallel to the translational freedom of movement of the grating and also to its axis of rotation. It should be noted that the orientation of the screw is not critical of itself but that the orientation of the surface 72 must be accurately defined.

Bearing against the flat surface 72 is a spherical surface element 75 carried by the lever arm 44. The force of engagement is provided by the spring 48. This spherical surface element 75 is mounted on a sine drive adjustment slide 77 which in turn is slidably secured to the lever arm 44 by cap screws 79. The adjustment slide 77 is maintained in fixed alignment with the lever arm 44 by a pair of cylindrical rods 81 fitting in corresponding V-slots in the arm and slide. The position of the spherical surface element 75 along the length of the lever arm 44 is adjustable by means of a thumb screw 83 having right- and left-handed threaded portions 84 and 85 engaging the slide 77 and a relatively fixed block 88, respectively.

The operation of the sine drive from central image is as follows. Rotation of the screw 60 produces a displacement of a point on the lever arm 44, corresponding to the center of the spherical surface element 75, which displacement has a predeterminable component in a direction perpendicular to the translational freedom of movement of the grating. This displacement component will in turn cause a rotation of the grating about its vertical axis through an angle whose sine is equal to the magnitude of that component divided by the effective length of the lever arm between the pivot axis of the grating and the sphere's center. From an examination of the geometry of the system, it is further apparent that this sine function rotation will be obtained independently of the focusing translation of the grating towards or from the slits, the optically flat surface 72 and the translation of the grating being parallel.

While it is recognized in the art that the wavelength of the light dispersed by a grating at a particular angle is linearly dependent upon the sine of the angular displacement of the grating from its central image position rather than upon the angle of displacement itself, the determination of the wavelength of light projected into the exit slit of the present instrument must also take into account the fact that the angles of incidence and diffraction also change by a small amount during scanning due to the focusing displacement of the grating.

However, by having the focusing displacement occur in a direction which exactly bisects the optical axes, the effects of the changes in the angles of incidence and diffraction are made to cancel one another so that the linear dependence of wavelength upon the sine of the angular displacement of the grating is preserved. Further, since rotation of the screw 60 produces sine function rotation of the grating completely independently of the grating's translation, it is apparent that the wavelength of the light passing through the exit aperture is a linear function of the rotation of the screw and that, by the use of appropriate gearing, a simple counter coupled to the screw 60 can be made to read wavelengths directly. Fine adjustments of the correspondence ratio, which could not conveniently be made by the selection of gear ratios or screw pitch, can be made by adjusting the effective length of the lever arm using the thumb screw 83.

In summary it can be pointed out that the apparatus illustrated in FIGS. 1 to 9 utilizes stationary slits, operates under conditions of substantially normal incidence, thereby reducing astigmatism and polarization, automatically maintains focus during scanning, permits the direct reading of wavelengths on a counter, and, by virtue of the dual function of the lever arm 44 and the cooperation between the focusing and sine drive functions, is of simple and reliable construction.

An alternative embodiment of the invention is shown generally in FIG. 10 at 220 in conjunction with an ultraviolet lamp 222 and a detector 224. Lamp 222 includes a cathode 226, an anode 228 and a tube 230 extending therebetween for receiving an ionizable gas 232 from a suitable source. This gas, for example, may be a noble gas such as argon or an inert gas such as nitrogen. In a typical case, the potential difference between the anode and the cathode is from 10,000 to 30,000 volts and preferably 15,000 volts. A beam of ultraviolet radiation, generated within tube 230, is transmitted from an open end of the tube through an entrance slit 234 uninterrupted by a solid window of any type, into spectrometer 220. This beam impinges on concave diffraction grating 236. Concave grating 236 disperses the incident beam into a spectrum, a restricted portion of which is focused on an exit slit 238 for transmission to a detector 240. Rotation and reciprocation of the grating enables the selection of a particular portion of the spectrum for reception by the detector. The chamber of the spectrometer is exhausted as at 242 by a suitable pump so that in operation its pressure is of the order of a fraction of a micron of mercury.

The structure, as shown in detail in FIGS. 11, 12, 13 and 14, is suggested in FIG. 10 as comprising a cam mount 244 that is affixed to a shaft 246 and that carries grating 236. Shaft 246, which is rotatably carried by a carriage 254, extends through the slide and through the housing of chamber 220, the lower end being attached to an arm 248. The angular position of arm 248 is controlled by a nut 250, the position of which is determined by a screw 252 that is threadably received by a tapped bore in the nut. The arrangement is such that as cam mount 244 bears against a follower 256, carriage 254 is urged against the operation of a suitable spring along the axis bisecting the axis of incidence and the axis of diffraction. A suitable counter, geared to screw 252, indicates the wavelength output of the monitor directly by virtue of the rotational position of screw 252.

With reference now to the details of FIGS. 11, 12, 13 and 14, grating 236 is mounted for reciprocal movement as follows. As shown, housing 220 is provided with a base plate 258 having a slightly elongated slot 260. Affixed to base plate 258 by means of bolts 264 is a mounting plate 262 having a slightly elongated slot 266 initially in registration with elongated slot 260 of base plate 258. At the edges of mounting plate 262 are a pair of guides 268 and 270 (FIG. 13), which are secured to mounting plate 262 by suitable bolts 272 and the inner edges of which are provided with V-grooves 274, 274. Slidable on mounting plate 262 is aforementioned carriage 254, the longitudinal edges of which are provided with V-grooves 278, 278. V-grooves 278, 278 are aligned with V-grooves 274, 274 of guides 268 and 270. Within the races defined by V-grooves 274, 274 and 278, 278 are a series of balls 280 that constrain carriage 254 for reciprocable motion between guides 268 and 270 and prevent removal of carriage 254 from mounting plate 262. It will be observed that the rearward extremity of mounting plate 262 is provided with an extension 282 to which is affixed an inverted channel 284 by means of suitable bolts 286. Within channel 284 is a helical spring 288, one end of which is connected to a pin 290 at the outer extremity of channel 284 and the other extremity of which is connected to carriage 254 as at 292. Spring 288 serves to retract carriage 254 into its most rearward position.

Grating 236 is mounted for rotational movement as follows. Extending through carriage 254 and mounted thereon is a quill 294, the upper extremity of which is shouldered as at 296 and secured to carriage 254. Quill 294 is provided with an axial bore 298. The upper and lower extremities of quill 294 are recessed at 100 and 102 for the reception of bearings 104 and 106. Cam mount 244, described above in connection with FIG. 10, is in the form of an integral casting from which is machined a horizontally disposed cam profile 108 and vertically disposed shaft 246, described generally above. The upper shoulder of shaft 246 abuts against the inner race of bearing 104. The entire bearing assembly is clamped between the upper shoulder of shaft 246 and lock nuts 110 into which a lower threaded portion of shaft 246 is turned. Also secured to the lower extremity of shaft 246 and pivotable therewith is lever arm 248, described above.

Figure 11:
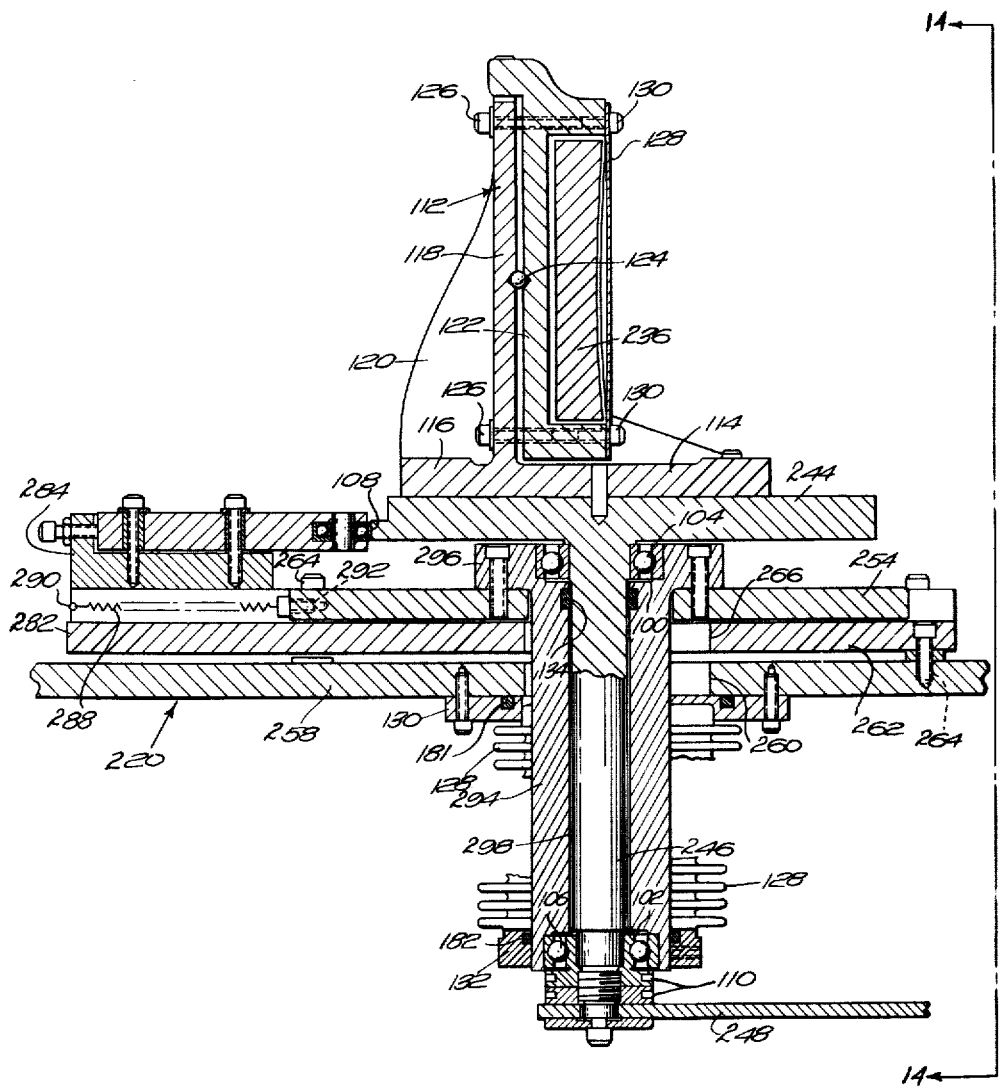
FIG. 11 is a section substantially on the line 11—11 of FIG. 10 showing a grating mounting.
Figure 13:
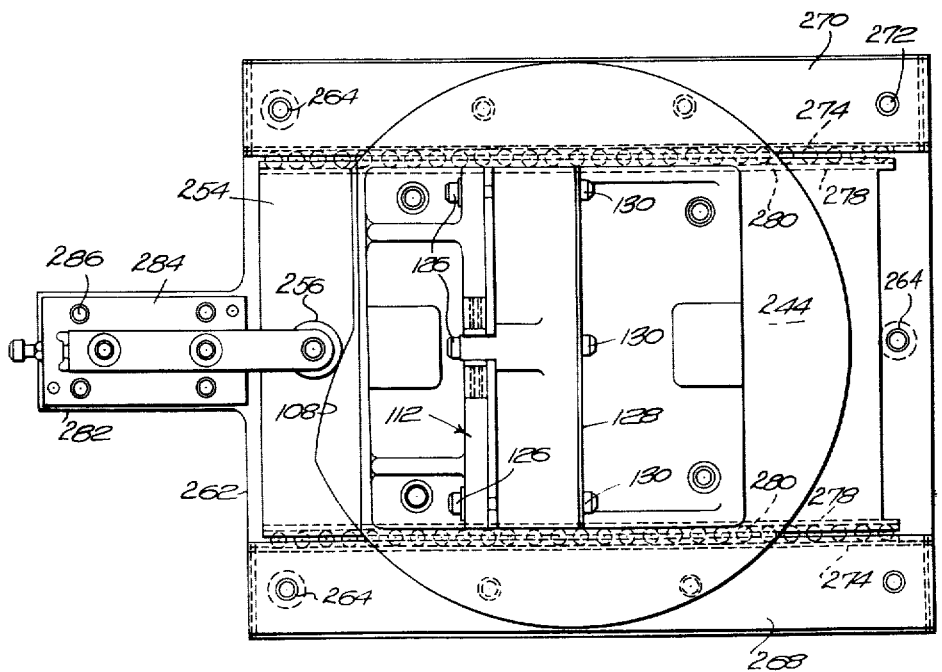
FIG. 13 is a plan view of the grating mounting.

As shown in FIGS. 11 and 13, the mount for grating 236 is in the form of a bracket 112 having a forwardly directed foot 114, a rearwardly directed heel 116, a vertically directed wall 118 and a reinforcing rib 120. A holder 122, in which grating 236 is directly received, is pivotally connected to wall 118 by means of a ball 124 that is received by conical indentations in the holder and the wall. The precise orientation of the holder with respect to the wall is determined by four screws, each designated 126. Grating 236 itself is retained within holder 122 by means of a suitable face plate 128 that is secured to holder 122 by suitable screws, each designated 130.

Figure 12:
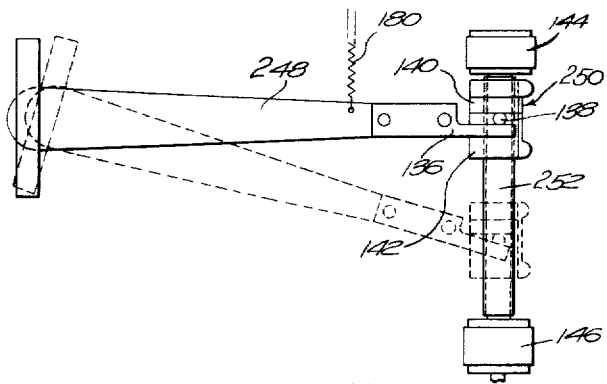
FIG. 12 is a simplified plan view to enlarged scale of the sine drive mechanism of the alternative embodiment.

It will be observed that lever 248 is outside of housing 220 so that it may be controlled by a suitable drive mechanism exterior to the evacuated interior. Also leakage between shaft 246 and the inner surface of quill 294 is prevented by a pair of rubber O-rings that are positioned within an interior recess 134 of quill 294. As is best shown in FIG. 12, the outer extremity of lever 248 is provided with a finger 136, the inner edge of finger 136 being provided with a conical indentation within which rides a suitable ball 138. Ball 138 is pressed against an optical flat that is machined from nut 250, described generally above. Nut 250 is provided with an internally threaded bore 142 that rotatably receives the threads of screw 252. The extremities of screw 252 are journaled in suitable bearing blocks 144 and 146. A suitable spring 180 biases lever arm 248 toward optical flat 140. As is shown in FIG. 10, the rotation of screw 252 may be determined by a suitable counter 150 directly calibrated in terms of selected wavelengths directed to exit slit 238 by grating 236.

In operation, after the spectrometer chamber has been evacuated and lamp 222 has been energized, any particular wavelength may be selected by simply causing rotation of screw 252. The rotation of screw 252 causes lever arm 248 to pivot to a predetermined position in consequence of which, by virtue of cam profile 108 of cam mount 244, grating 236 is moved along the axis midway between the entrance axis and the exit axis a predetermined distance. The arrangement is such that the rotation of the grating and the reciprocation of the grating is synchronized so that the entrance axis and the exit axis are a predetermined distance apart. The arrangement is such that the rotation of the grating and the reciprocation of the grating is synchronized so that the entrance and exit slits always are in focus. A bellows 128, with the aid of O-rings 181 and 182, prevents the penetration of air through this construction into the interior of the monochromator chamber.

In this latter embodiment of the invention certain of the components of the grating carriage and cam arrangement and of the drive arrangement are inside the housing and others are outside. In a further alternative embodiment of the invention, all of these components are within the housing as in the case where there is no requirement for evacuation of the housing. In another alternative embodiment of the present invention, all of these components are outside of the housing as in the case where extremely high vacuum within the housing is required and moving parts within the housing must be avoided as completely as possible.

It will also be understood that the reciprocable motion of the grating may be along other axes than the illustrated axis for special purposes without destroying the focusing capability of the apparatus of the present invention and that the principles of the present invention can be applied to instruments designed for wavelengths outside of the ultraviolet region.

Since certain changes may be made in the above described embodiments of the present invention without departing from the scope of the invention herein involved, it is intended that all matter contained in the above description or shown in the accompanying drawings shall be interpreted in an illustrative and not in a limiting sense and that the invention shall include all modifications and equivalents falling within the scope of the appended claims.

I claim:

1. Spectrometric apparatus comprising a housing; a concave diffraction grating within the housing; a stationary entrance aperture, said entrance aperture and the center of said grating defining an entrance optical axis; a stationary exit aperture, said exit aperture and the center of said grating defining an exit optical axis, the optical axes forming an acute angle at the grating; a mount for said grating which permits the grating both to rotate about an axis which is perpendicular to both of the optical axes and to translate in a straight-line towards and from said apertures, means for rotating said grating thereby to scan a spectrum at said exit aperture; cam and cam follower means one portion of which is attached to said mount and another portion of which is attached to said housing for producing a translation of said grating in response to its rotation appropriate for maintaining the spectrum always in focus on said exit aperture.

2. Spectrometric apparatus comprising a housing; a concave diffraction grating within the housing; a stationary entrance aperture, said entrance aperture and the center of said grating defining an entrance optical axis; a stationary exit aperture, said exit aperture and the center of said grating defining an exit optical axis; a mount for said grating which permits the grating to both rotate about an axis which is perpendicular to both of the optical axes and to translate in a direction bisecting the angle between the optical axes; means for rotating said grating thereby to scan a spectrum at said exit aperture; cam and cam follower means one portion of which is attached to said mount and another portion of which is attached to said housing for producing a translation of said grating in response to its rotation appropriate for maintaining the spectrum always in focus on said exit aperture.

3. Spectrometric apparatus comprising a housing; a concave diffraction grating within the housing; a stationary entrance aperture, said entrance aperture and the center of said grating defining an entrance optical axis; a stationary exit aperture, said exit aperture and the center of said grating defining an exit optical axis, the optical axes forming an acute angle at the grating; a mount for said grating which permits the grating to both rotate about an axis which is perpendicular to both of the optical axes and to translate in a direction bisecting the angle between the optical axes; drive means for rotating said grating independently of its translation; a cam rigidly connected to said grating; a cam follower connected to said housing; means for urging said cam against said cam follower thereby to produce a translation of said grating in response to its rotation appropriate for maintaining the spectrum always in focus on said exit aperture.

4. Apparatus according to claim 3 in which the drive means produces sine function rotation of the grating independently of its translation.

5. Spectrometric apparatus comprising a housing; a concave diffraction grating within the housing; a stationary extrance aperture, said entrance aperture and the center of said grating defining an entrance optical axis; a stationary exit aperture, said exit aperture and the center of said grating defining an exit optical axis, the optical axes forming an acute angle at the grating, a mount for said grating which permits the grating to both rotate about an axis which is perpendicular to both of the optical axes and to translate in a direction substantially bisecting the angle between the optical axes; a lever arm rigidly connected to said grating and extending generally along said direction; drive means for controlling the rotational orientation of said lever arm independently of its translation; a cam follower at the end of said lever; a cam attached to said housing; and means for urging said cam follower against said cam, the shape of the cam being such as to produce a translation of said grating in response to its rotation appropriate for maintaining the spectrum always in focus on said exit aperture.

6. Apparatus according to claim 5 in which said drive means produces sine function rotation of the grating independently of its translation.

7. Spectrometric apparatus comprising a housing; a concave diffraction grating within the housing; a stationary entrance aperture, said entrance aperture and the center of said grating defining an entrance optical axis; a stationary exit aperture, said exit aperture and the center of said grating defining an exit optical axis, the optical axes forming an acute angle at the grating; a mount for said grating which permits the grating to both rotate about an axis which is perpendicular to both of the optical axes and to translate in a direction bisecting the angle between the optical axes; a lever arm rigidly connected to said grating and extending generally in said direction; drive means for controlling the position of a point fixed on said lever arm in a direction transverse to said direction without limiting the translation of said grating; a cam follower at the end of said lever arm; a cam attached to said housing; and means for urging said cam follower against said cam, the shape of the cam being such as to produce a translation of said grating in response to its rotation appropriate for maintaining the spectrum always in focus on said exit aperture.

8. Apparatus according to claim 7 in which said drive means includes a screw rotatably supported adjacent said lever arm and oriented transversely to the translational freedom of movement of said grating; a nut for said screw, said nut including a flat surface which is parallel to the translational freedom of movement of the grating; a spherical surface element attached to said lever arm and located so that the center of its spherical surface and the axis of rotation of the grating define a plane which is parallel to the translational freedom of movement of the grating when the central image of said entrance aperture falls on said exit aperture.

9. Spectroscopic apparatus comprising a housing having a chamber, an entrance to said chamber, a diffraction grating within said chamber, the center of said grating and said entrance defining an entrance optical axis, an exit from said chamber, said exit and the center of said grating defining an exit optical axis, said entrance and exit optical axes forming an acute angle at the grating, a carriage slidable with respect to said housing in a straight line towards and from said entrance and exit, a mount including cam means and shaft means operatively connected to each other, said grating being mounted with respect to said cam means, said shaft means being rotatable on said carriage, cam follower means mounted with respect to said housing, and drive means operatively connected to said shaft, the shape of said cam means being such that rotation of said shaft to scan a spectrum at said exit also produces a translation of said carriage appropriate for maintaining the spectrum always in focus at said exit.

10. The spectroscopic apparatus of claim 9 wherein said shaft means projects through an elongated slot in said housing and said drive means is outside of said housing.

11. The spectroscopic apparatus of claim 9 wherein said drive means is pivotally controlled by a nut, the position of which is determined by a rotatable screw.

12. The spectroscopic apparatus of claim 9 wherein said shaft means projects through an elongated slot in said housing, said drive means is outside of said housing and a bellows surrounds said shaft means.

13. A spectrometer system comprising a housing having a chamber, an entrance to said chamber, a diffraction grating within said chamber, the center of said grating and said entrance defining an entrance optical axis, an exit from said chamber, the center of said grating and said exit defining an exit optical axis, a lamp at said entrance including means for producing radiation, an elongated slot in said housing, a mount slidable within said housing at said slot in a direction bisecting the angle formed by said entrance and exit optical axes at the grating, a quill having one of its ends affixed to said mount and a portion thereof projecting through said slot, a mount including a cam and a shaft affixed to each other inside said chamber, said grating being mounted on said cam, said shaft projecting into said quill, a cam follower affixed to said housing and bearing against said cam, a lever affixed to said shaft outside of said chamber, and means for controlling the orientation of said lever, the shape of said cam being such that rotation of said shaft to scan a spectrum at said exit also produces a translation of said mount appropriate for maintaining the spectrum always in focus at said exit.

14. The system of claim 13 including a bellows surrounding said quill, one end of said bellows being connected to said housing, the other end of said bellows being connected to the outer extremity of said quill.

15. The system of claim 13 wherein said last mentioned means includes a screw, means for precisely controlling the rotation of said screw, a nut having an internally threaded bore receiving said screw, said nut bearing against said lever.

16. Spectroscopic apparatus comprising entrance slit means fixed in space, exit slit means fixed in space, a grating, said grating and said entrance slit means defining an entrance optical axis, said grating and said exit slit means defining an exit optical axis with said entrance and exit optical axes forming an acute angle at said grating, and means for mounting said grating for synchronized rotation and translation in a direction towards and from said entrance and exit slit means so as to maintain perfect horizontal focus throughout an extended wavelength shift.

17. Spectroscopic apparatus comprising a housing having an evacuated chamber, an entrance to said chamber, a diffraction grating within said chamber, the center of said grating and said entrance defining an entrance optical axis, an exit from said chamber, the center of said grating and said exit defining an exit optical axis, said entrance and exit optical axes forming an acute angle at said grating, a carriage slidable within said housing in a direction bisecting said acute angle, a mount including a cam and a shaft affixed to each other, said grating being mounted on said cam, said shaft being rotatable on said carriage, a lever affixed to said shaft, and a follower fixed to said housing and bearing against said cam, the shape of said cam being such that rotation of said shaft to scan a spectrum at said exit also produces a translation of said carriage appropriate for maintaining the spectrum always in focus at said exit.

18. The spectroscopic apparatus of claim 17 wherein said shaft projects through an elongated slot in said housing and said lever is outside of said housing.

19. The spectroscopic apparatus of claim 17, wherein said lever is pivotally driven by a nut, the position of which is determined by a rotatable screw.

20. The spectroscopic apparatus of claim 17 wherein said shaft projects through an elongated slot in said housing, said lever is outside of said housing and a bellows surrounds said shaft and hermetically isolates said housing from its exterior.

21. A spectrometer system comprising a housing having an evacuated chamber, an entrance to said chamber, a diffraction grating within said chamber, the center of said grating and said entrance defining an entrance optical axis, an exit from said chamber, the center of said grating and said exit defining an exit optical axis, an ultraviolet radiation lamp at said entrance and including means for exciting an ionizable gas in order to produce ultraviolet radiation, an elongated slot in said housing, a mount slidable within said housing at said slot in a direction bisecting the angle formed by said entrance and exit optical axes at said grating, a quill having one of its ends affixed to said slide and a portion thereof projecting through said slot, a mount including a cam and a shaft affixed to each other inside said chamber, said grating being mounted on said cam, said shaft projecting into said quill, a cam follower affixed to said housing and bearing against said cam, a lever affixed to said shaft outside of said chamber, and means for controlling the orientation of said lever the shape of said cam being such that rotation of said shaft to scan a spectrum at said exit also produces a translation of said mount appropriate for maintaining the spectrum always in focus at said exit.

22. The system of claim 21 including a bellows surrounding said quill, one end of said bellows being connected to said housing, the other end of said bellows being connected to the outer extremity of said quill.

23. The system of claim 21 wherein said last mentioned means includes a screw, means for precisely controlling the rotation of said screw, a nut having an internally threaded bore receiving said screw, said nut bearing against said lever.

References Cited in the file of this patent

UNITED STATES PATENTS

| | | |
|---|---|---|
| 1,840,476 | Twyman | Jan. 12, 1932 |
| 2,412,940 | Avery | Dec. 24, 1946 |
| 2,706,253 | Hutchins et al. | Apr. 12, 1955 |
| 2,948,184 | Johnson | Aug. 9, 1960 |

Disclaimer 3,090,863. — *Paul M. McPherson*, Acton, Mass. MONOCHROMATOR ADAPTED FOR USE IN THE ULTRAVIOLET REGION. Patent dated May 21, 1963. Disclaimer filed May 29, 1968, by the inventor and the assignee, *McPherson Instrument Corporation*.

Hereby enter this disclaimer to claims 1, 2, 3 and 16 of said patent.

[*Official Gazette July 2, 1968.*]